US010503569B2

(12) United States Patent
Bharti et al.

(10) Patent No.: US 10,503,569 B2
(45) Date of Patent: Dec. 10, 2019

(54) FEATURE-BASED APPLICATION PROGRAMMING INTERFACE COGNITIVE COMPARATIVE BENCHMARKING

(71) Applicant: International Business Machines Corporation, Armonk, NY (US)

(72) Inventors: Harish Bharti, Pune (IN); Amol Dhondse, Pune (IN); Abhay Patra, Pune (IN); Anand Pikle, Pune (IN); Rakesh Shinde, Pune (IN)

(73) Assignee: International Business Machines Corporation, Armonk, NY (US)

( * ) Notice: Subject to any disclaimer, the term of this patent is extended or adjusted under 35 U.S.C. 154(b) by 46 days.

(21) Appl. No.: 15/954,951

(22) Filed: Apr. 17, 2018

(65) Prior Publication Data

US 2019/0317842 A1 Oct. 17, 2019

(51) Int. Cl.

| | |
|---|---|
| ***G06F 9/54*** | (2006.01) |
| ***G06Q 30/02*** | (2012.01) |
| ***G06N 20/00*** | (2019.01) |
| ***G06F 16/28*** | (2019.01) |
| *G06F 16/22* | (2019.01) |

(52) U.S. Cl.

CPC ............ *G06F 9/543* (2013.01); *G06F 16/285* (2019.01); *G06N 20/00* (2019.01); *G06Q 30/0283* (2013.01); *G06F 16/2246* (2019.01)

(58) Field of Classification Search

CPC combination set(s) only.
See application file for complete search history.

(56) References Cited

U.S. PATENT DOCUMENTS

| | | | | |
|---|---|---|---|---|
| 6,253,257 | B1 | 6/2001 | Dundon | |
| 8,099,709 | B2 | 1/2012 | Baikov et al. | |
| 9,667,704 | B1 * | 5/2017 | Sonawane | H04L 67/10 |
| 2008/0154798 | A1 | 6/2008 | Valz | |
| 2013/0086553 | A1 * | 4/2013 | Grechanik | G06F 8/70 717/123 |
| 2014/0006237 | A1 | 1/2014 | Chiang et al. | |
| 2014/0087697 | A1 * | 3/2014 | Johnston | H04W 4/12 455/412.1 |
| 2015/0254701 | A1 | 9/2015 | Laredo et al. | |

(Continued)

OTHER PUBLICATIONS

Narahari et al., "Dynamic Pricing Models for Electronic Business", Sadhara, vol. 30, Issue 2-3, Apr. 2005, pp. 231-256.

(Continued)

*Primary Examiner* — Tuan C Dao
(74) *Attorney, Agent, or Firm* — Yee & Associates, P.C.

(57) ABSTRACT

Attribute-based application programming interface (API) comparative benchmarking is provided. In response to determining that a target API maps to an existing API classification based on attributes of the target API, a weighted average of benchmark confidence scores of other APIs in a same class as the target API is determined. A benchmark confidence score is determined for the target API based on feedback, reviews, and ratings. The benchmark confidence score of the target API is compared with the weighted average of benchmark scores. An attribute-based API classification mapping is updated based on the comparison. Pricing for the target API is determined based on a weighted average of API pricing across the other APIs in the same class as the target API.

20 Claims, 8 Drawing Sheets

(56) References Cited

U.S. PATENT DOCUMENTS

| | | | |
|---|---|---|---|
| 2016/0092897 | A1 | 3/2016 | Natarajan |
| 2016/0225042 | A1 | 8/2016 | Tran et al. |
| 2016/0292018 | A1 | 10/2016 | Laredo et al. |

OTHER PUBLICATIONS

Lee et al., "Context Attributes: An Approach to Enable Content-awareness for Service Discovery", 2003 Symposium on Applications and the Internet, Jan. 2003, 9 pages.

* cited by examiner

API COMPARATIVE BENCHMARKING GRAPHICAL USER INTERFACE 400

| | COMPARATIVE BENCHMARKING | SUBJECT API (410) | REFERENCE API 1 (412) | REFERENCE API 2 (414) | REFERENCE API 3 (416) |
|---|---|---|---|---|---|
| 402 | API NAME | getEquipmentHealthInfo | getAssetConditionInfo | getEquipmentConditionInfo | getAssetHealthInfo |
| 404 | STANDARD | INDUSTRY STANDARD | OPEN STANDARD | INDUSTRY STANDARD, CAPABILITY MODEL | ENTERPRISE STANDARD |
| 406 | BCS MATCHING LEVEL | N/A | MEDIUM | HIGH | HIGH |
| 408 | PRICING | SUGGESTED PRICE = $0.11/CALL | $0.09/CALL | $0.12/CALL | $0.10/CALL |

FIG. 4

FEATURE COMPARISON TABLE 600

602 604 606

| FEATURES | SCORE BASED ON PERCEIVED VALUE BY CONSUMERS | RELATIVE PRICING INPUTS FOR FINE TUNING PRICING |
|---|---|---|
| F1 | 87 | SUPERIOR TO PROVIDER 1's API, BUT EQUIVALENT TO PROVIDER 2's API |
| F2 | 92 | API 5 |
| F3 | 95 | API 7 |
| F4 | 99 | API 3 |
| F5 | 89 | API 10 |
| F6 | 90 | API 9 |
| F7 | 96 | API 6 |

FIG. 6

FEATURE-BASED APPLICATION PROGRAMMING INTERFACE COGNITIVE COMPARATIVE BENCHMARKING

BACKGROUND

1. Field

The disclosure relates generally to application programming interfaces and more specifically to application programming interface pricing using feature-based cognitive comparative benchmarking and value rationalization.

2. Description of the Related Art

An application programming interface (API) is a particular set of rules and specifications that a software program can follow to access and make use of the services and resources provided by another particular software program that implements that API. The API specifies how software components interact with each other, and often comes in the form of a library that includes specifications for routines, data structures, object classes, and variables. An API specifies a set of functions and routines that accomplish a task or are allowed to interact with a specific software component and serves as an interface between different software programs and facilitates their interaction.

For example, when a user buys movie tickets online and enters credit card information, the movie ticket Web site uses an API to send the credit card information to a remote application that verifies whether the credit card information is correct. Once payment is confirmed, the remote application sends a response back to the movie ticket Web site indicating that the move ticket Web site may issue the tickets to the user. The user only sees the movie ticket Web site interface, but behind the scenes many applications are working together using application programming interfaces (APIs) to provide the service.

In addition, a developer may publish an API online so that other developers can design software products that are based on the published API. Publishing APIs online allows API developer communities to create an open architecture for sharing content and data between communities and applications. As a result, applications may be based on APIs from multiple developers at all levels, such as, for example, at the application level, the platform level, the infrastructure level, and the like.

Further, enterprises are moving toward monetizing data and insights derived from analytics to combine applications, data, partners, and customers into a single, inter-connected eco-system. The number of open APIs has doubled every year, growing from just a few in 2005 to over 15,000 today and possibly to over hundreds of thousands in the next five years.

SUMMARY

According to one illustrative embodiment, a computer-implemented method for attribute-based application programming interface (API) comparative benchmarking is provided. In response to a computer determining that a target API maps to an existing API classification based on attributes of the target API, the computer determines a weighted average of benchmark confidence scores of other APIs in a same class as the target API. The computer determines a benchmark confidence score for the target API based on feedback, reviews, and ratings. The computer compares the benchmark confidence score of the target API with the weighted average of benchmark scores. The computer updates an attribute-based API classification mapping based on the comparison. The computer determines pricing for the target API based on a weighted average of API pricing across the other APIs in the same class as the target API. According to other illustrative embodiments, a computer system and computer program product for attribute-based API comparative benchmarking are provided.

BRIEF DESCRIPTION OF THE DRAWINGS

FIG. 4 is a diagram illustrating an example of an API comparative benchmarking graphical user interface in accordance with an illustrative embodiment;

FIG. 6 is an example of an API feature comparison table in accordance with an illustrative embodiment.

DETAILED DESCRIPTION

Figure 1:
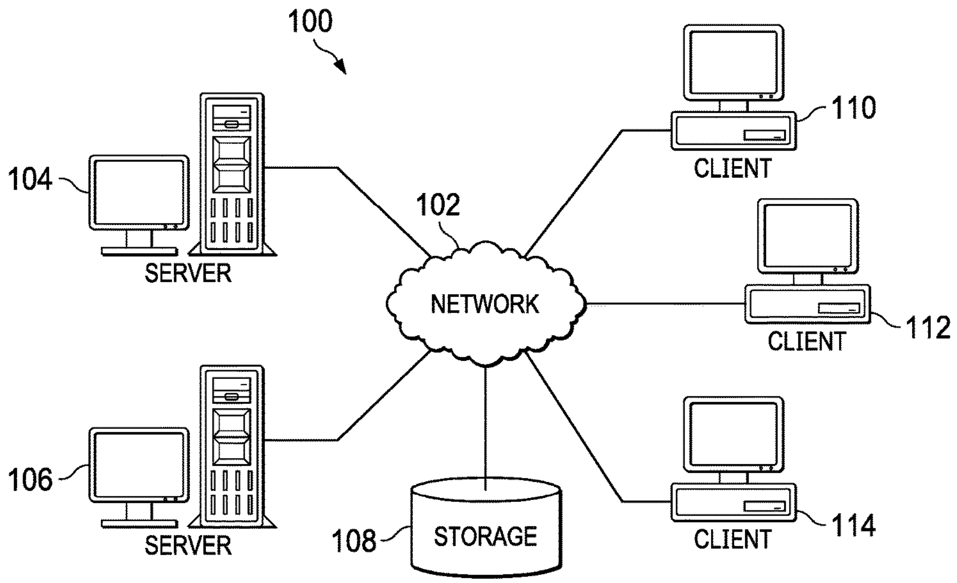
FIG. 1 is a pictorial representation of a network of data processing systems in which illustrative embodiments may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
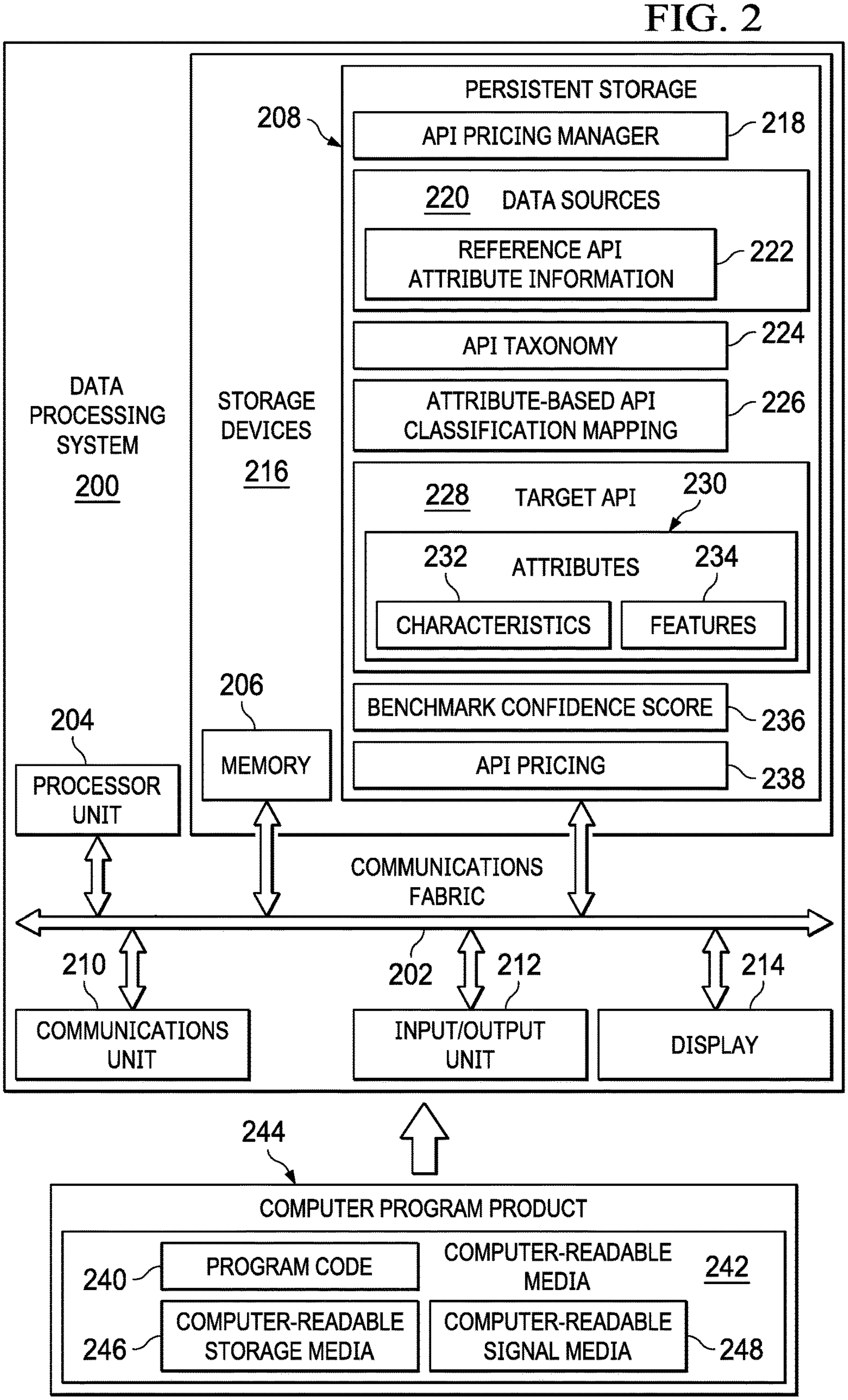
FIG. 2 is a diagram of a data processing system in which illustrative embodiments may be implemented.
Figure 3:
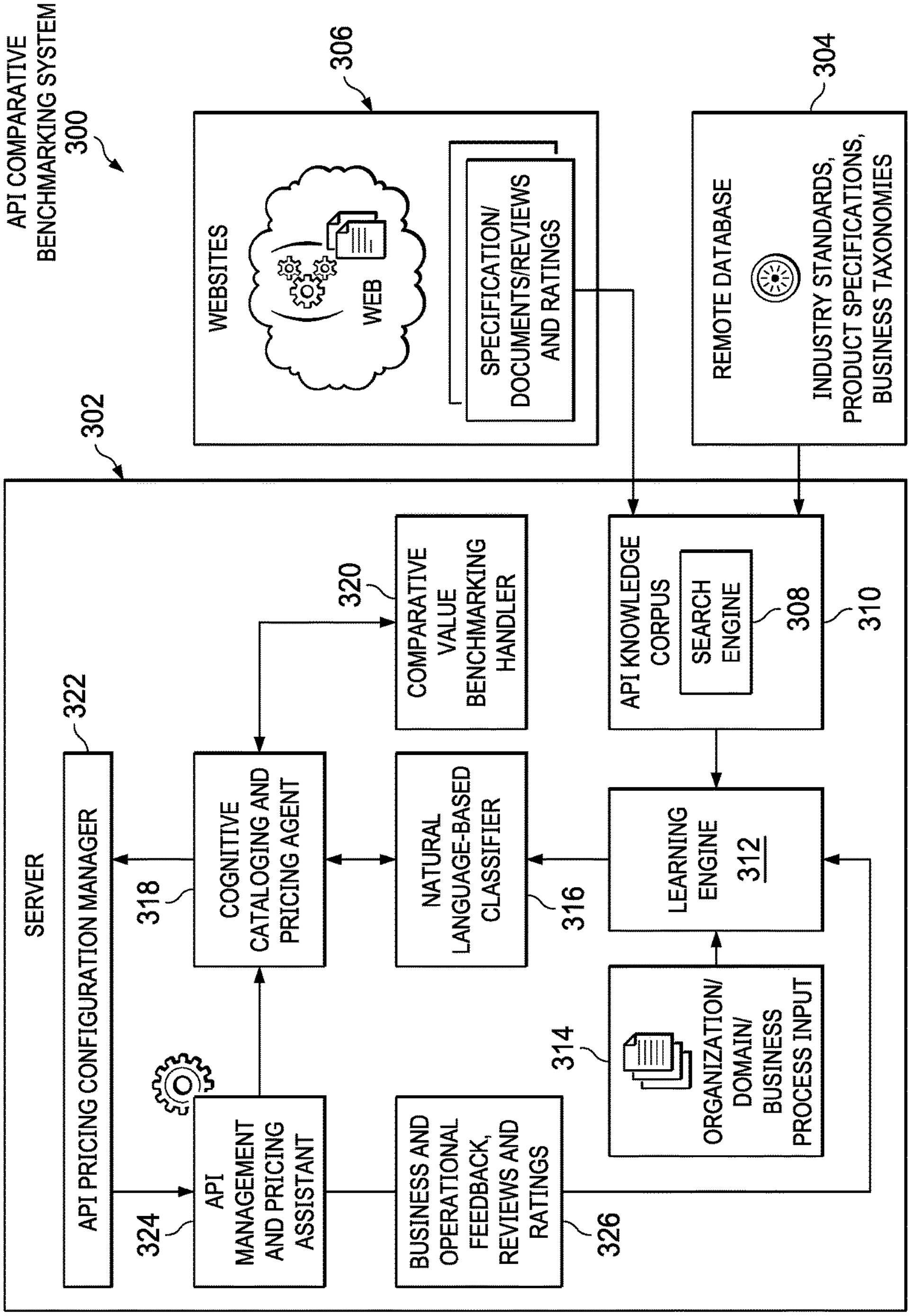
FIG. 3 is a diagram of a feature-based application programming interface (API) comparative benchmarking system in which illustrative embodiments may be implemented.

With reference now to the figures, and in particular, with reference to FIGS. 1-3, diagrams of data processing environments are provided in which illustrative embodiments may be implemented. It should be appreciated that FIGS. 1-3 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, and fiber optic cables.

In the depicted example, server 104 and server 106 connect to network 102, along with storage 108. Server 104 and server 106 may be, for example, server computers with high-speed connections to network 102. In addition, server 104 and server 106 may provide services for pricing application programming interfaces (APIs) using cognitive feature-based comparative benchmarking and value rationalization. Also, it should be noted that server 104 and server 106 may each represent a cluster of servers in a data center, for example, providing a plurality of different application programming interface (API) pricing services. Alternatively, server 104 and server 106 may be computer nodes in a cloud environment that provides API pricing services.

Client 110, client 112, and client 114 also connect to network 102. Clients 110, 112, and 114 are registered clients of server 104 and server 106. Clients 110, 112, and 114 may each represent a set of one or more client devices corresponding to different API providers. Users of clients 110, 112, and 114 may utilize clients 110, 112, and 114 to access the API pricing services provided by server 104 and server 106. Alternatively, clients 110, 112, and 114 may represent client devices of different API consumers. In this case, users of clients 110, 112, and 114 may utilize clients 110, 112, and 114 to consume or use APIs at prices set by server 104 and server 106 for respective APIs based on cognitive feature-based comparative API benchmarking.

In this example, clients 110, 112, and 114 are illustrated as desktop or personal computers with wire communication links to network 102. However, it should be noted that clients 110, 112, and 114 are meant as examples only. In other words, clients 110, 112, and 114 may include other types of data processing systems, such as, for example, network computers, laptop computers, handheld computers, smart phone, smart watches, smart appliances, gaming devices, and the like, with wire or wireless communication links to network 102.

Storage 108 is a network storage device capable of storing any type of data in a structured format or an unstructured format. In addition, storage 108 may represent a set of one or more network storage devices. Storage 108 may store, for example, a plurality of different APIs and their corresponding identifiers; attribute information, such as characteristics and features, corresponding to each of the plurality of different APIs; API taxonomies; attribute-based API classification mapping; benchmark confidence scores for each of the plurality of different APIs; pricing for each of the plurality of different APIs based on respective benchmark confidence scores; and the like. Further, storage 108 may store other data, such as authentication or credential data that may include user names, passwords, and biometric data associated with system administrators and client device users, for example.

In addition, it should be noted that network data processing system 100 may include any number of additional server devices, client devices, and other devices not shown. Program code located in network data processing system 100 may be stored on a computer readable storage medium and downloaded to a computer or data processing system for use. For example, program code may be stored on a computer readable storage medium on server 104 and downloaded to client 110 over network 102 for use on client 110.

In the depicted example, network data processing system 100 may be implemented as a number of different types of communication networks, such as, for example, an internet, an intranet, a local area network (LAN), a wide area network (WAN), or any combination thereof. FIG. 1 is intended as an example only, and not as an architectural limitation for the different illustrative embodiments.

With reference now to FIG. 2, a diagram of a data processing system is depicted in accordance with an illustrative embodiment. Data processing system 200 is an example of a computer, such as server 104 in FIG. 1, in which computer readable program code or program instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. In addition, processor unit 204 may represent a set of two or more hardware processor devices or may represent one processor device with two or more processor cores, depending on the particular implementation.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Memory 206, in these examples, may be, for example, a random-access memory, or any other suitable volatile or non-volatile storage device. Persistent storage 208 may take various forms, depending on the particular implementation. For example, persistent storage 208 may contain one or more devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

In this example, persistent storage 208 stores API pricing manager 218. However, it should be noted that even though API pricing manager 218 is illustrated as residing in persistent storage 208, in an alternative illustrative embodiment API pricing manager 218 may be a separate component of data processing system 200. For example, API pricing manager 218 may be a hardware component coupled to communication fabric 202 or a combination of hardware and software components. API pricing manager 218 controls the processes of pricing APIs using cognitive feature-based comparative benchmarking and value rationalization.

Data Sources 220 represent names and identifiers for a plurality of API information sources, such as, for example, remote databases and websites containing API industry standards, API enterprise standards, API specifications, enterprise API taxonomies, API reviews, API ratings, enterprise API feedback, API consumer feedback, and the like. API pricing manager 218 utilizes data sources 220 to generate reference API attribute information 222. Reference API attribute information 222 represents data, such as characteristics and features, corresponding to respective reference APIs.

API taxonomy 224 represents a classification of the reference APIs in a hierarchy structure. Attribute-based API classification mapping 226 represents a mapping of API classes to specific API features in API taxonomy 224.

Target API 228 represents a particular API that API pricing manager 218 selected for pricing. Target API 228 includes attributes 230. Attributes 230 of target API 228 comprise characteristics 232 and features 234. Characteristics 232 represent a set of properties, such as API name, API provider name, API description, and the like, corresponding to target API 228. Features 234 represent a set of functions or operations that target API 228 is capable of performing.

API pricing manager 218 compares attributes 230 of target API 228 with reference API attribute information 222 corresponding to reference APIs in a same API class as target API 228. Further, API pricing manager 218 generates benchmark confidence score 236 for each reference API in the same API class as target API 228 based on the comparison of API attributes (i.e., features of each respective API). Benchmark confidence score 236 represents how closely a reference API matches target API 228 based on same or similar features as features 234.

API pricing 238 represents a price for target API 228. API pricing manager 218 generates API pricing 238 for target API 228 based on an average price of reference APIs in the same API classification as target API 228 having a respective benchmark confidence score above a predefined threshold score, for example. Further, API pricing manager 218 may apply a different weight to prices of reference APIs with identical attributes based on ratings and/or reviews of each respective reference API included in the calculation of API pricing 238.

Communications unit 210, in this example, provides for communication with other computers, data processing systems, and devices via a network, such as network 102 in FIG. 1. Communications unit 210 may provide communications using both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra-high frequency, microwave, wireless fidelity (WiFi), Bluetooth® technology, global system for mobile communications (GSM), code division multiple access (CDMA), second-generation (2G), third-generation (3G), fourth-generation (4G), 4G Long Term Evolution (LTE), LTE Advanced, or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keyboard, keypad, mouse, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented program instructions, which may be located in a memory, such as memory 206. These program instructions are referred to as program code, computer usable program code, or computer readable program code that may be read and run by a processor in processor unit 204. The program code, in the different embodiments, may be embodied on different physical computer readable storage devices, such as memory 206 or persistent storage 208.

Program code 240 is located in a functional form on computer readable media 242 that is selectively removable and may be loaded onto or transferred to data processing system 200 for running by processor unit 204. Program code 240 and computer readable media 242 form computer program product 244. In one example, computer readable media 242 may be computer readable storage media 246 or computer readable signal media 248. Computer readable storage media 246 may include, for example, an optical or magnetic disc that is inserted or placed into a drive or other device that is part of persistent storage 208 for transfer onto a storage device, such as a hard drive, that is part of persistent storage 208. Computer readable storage media 246 also may take the form of a persistent storage, such as a hard drive, a thumb drive, or a flash memory that is connected to data processing system 200. In some instances, computer readable storage media 246 may not be removable from data processing system 200.

Alternatively, program code 240 may be transferred to data processing system 200 using computer readable signal media 248. Computer readable signal media 248 may be, for example, a propagated data signal containing program code 240. For example, computer readable signal media 248 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 240 may be downloaded over a network to persistent storage 208 from another device or data processing system through computer readable signal media 248 for use within data processing system 200. For instance, program code stored in a computer readable storage media in a data processing system may be downloaded over a network from the data processing system to data processing system 200. The data processing system providing program code 240 may be a server computer, a client computer, or some other device capable of storing and transmitting program code 240.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 246 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Illustrative embodiments address and take into account that current solutions related to network services (i.e., API management and pricing) have challenges, mostly due to a bottom-up, static, human activity driven approach, resulting in enterprises under-monetizing and/or consumers overspending on network services. Some reasons for the under-monetizing and overspending are due to the following challenges: 1) static pre-negotiated API pricing, which is usually based on a standard pay-as-you-go usage policy, independent of demand, relevance, and quality of provided services; 2) lack of a standard mechanism to automatically determine API rating and pricing based on dynamically benchmarking value based on demand and relevance in relation to other available APIs in a same API class; 3) no current mechanism exists that is available to API providers to adjust metering policy based on continuous and competitive evaluation of quality and relevance of an API, prior to a consumer purchasing and consuming the API; 4) lack of ability to benchmark and adjust pricing of an API based on known demand for a similar API or based on known supply cost of collection, aggregation, or retrieval at the API provider; and 5) no standard mechanism currently exists to influence API pricing policy based on comparative benchmarking of similar or equivalent APIs via third party reviews and ratings of the APIs.

Illustrative embodiments dynamically determine and adjust API pricing using a scoring model (i.e., benchmark confidence scores) that classifies and benchmarks an API based on closeness of features of similar APIs. Illustrative embodiments may determine pricing parameters of APIs and their dependent resources based on unstructured natural language input retrieved from multiple data sources. Further, illustrative embodiments may dynamically re-price matching APIs based on benchmark confidence scores.

Furthermore, illustrative embodiments determine reference pricing using machine learning, which determines API classification using natural language processing based on API documentation and data for price benchmarking of an API in relation to other APIs in a same class and having similar function across standards and providers. In addition, illustrative embodiments dynamically adjust pricing parameters (e.g., rate, price slabs, discounts, and the like) based on quality and relevance of an API that illustrative embodiments determine to be in a same or similar API classification and based on competitive evaluation of the quality and relevance of the API across one or more API providers using supervised machine learning at an atomic level, such as a user, organization, or product level, and/or an aggregated level. For example, illustrative embodiments may determine API pricing at an individual API level or at a sub-API portfolio level. For example, illustrative embodiments may retrieve account details corresponding to a particular set of APIs in an API portfolio of a business based on benchmarking with similar business API portfolios.

Moreover, illustrative embodiments derive value and target pricing of APIs based on respective API benchmark confidence scores. Illustrative embodiments determine respective API benchmark confidence scores based on closeness of API nodes to other API nodes at a same level and/or distance from parent API nodes in an API portfolio hierarchy within a same or similar API class, area, category, or function. Illustrative embodiments determine an API class, area, category, or function using a multitude of inputs, such as domain and industry standards, business taxonomies, and/or business processes. For example, in a context of a workflow for accident insurance claims, illustrative embodiments benchmark an API based on APIs that are contextually and functionally related or nearer to that particular domain.

Illustrative embodiments also self-adjust API pricing thresholds via continuous discovery of similar or equivalent APIs across an organization and third-party providers given a business context, which is based on organizational or domain feedback. For example, an API most recently identified by an organization or domain as being useful will have an increased chance of being priced closer to similar APIs via the continuous self-learning process of illustrative embodiments. In addition, illustrative embodiments iteratively refine API pricing using benchmark confidence scores and re-price closest matching APIs to the target API based on dynamically varying weights. Illustrative embodiments dynamically vary weights based on input from a supervising user or subject matter expert. The supervising user or subject matter expert's input is based on historical API usage, feedback, reviews, ratings, and evolving domain corpus. For example, if two APIs, which have identical attributes, are available for retrieval of asset health, then illustrative embodiments calculate a lower benchmark confidence score for the API having a lower rating, which results in illustrative embodiments assigning a lower weightage to that API for determining price.

Further, illustrative embodiments determine API price based on comparative benchmark confidence scoring with respect to APIs with similar functional and non-functional features, such as, for example, API functionality, API availability, cost of collection and aggregation of input data sets from data sources, and the like. For example, illustrative embodiments in determining pricing of a particular API, which returns user information that was retrieved from a social profile of the user on a social media web site, will need to factor in the pricing of the social media web site's API.

Example implementation steps of illustrative embodiments may be: 1) identify similar and duplicate APIs based on business purpose, input/output dataset, and other characteristics to determine a candidate API for benchmarking; 2) perform cognitive API classification based on historical and contextual information using self-learning, which is based on prior API classification and organizational and industry inputs; 3) determine comparative benchmark confidence scores based on feedback, reviews, and ratings; 4) enable user validation via dialog-based user interface that prompts the user (e.g., business administrator) to configure API pricing based on suggested pricing; and 5) determine suggested API pricing based on depth weighted average across parent API nodes in an API portfolio hierarchy.

Thus, illustrative embodiments may be utilized both in traditional and in Infrastructure as a Service (IaaS) and Platform as a Service (PaaS)-based cloud offerings. In addition, illustrative embodiments also may be utilized in cognitive, big data, and analytics solutions to provide business and commercial value. Further, illustrative embodiments may be utilized in API enablement platforms to provide federated API binding and invocation to developers. Furthermore, illustrative embodiments may be utilized by API providers to maximize revenue and provide a competitive advantage in the API marketplace.

With reference now to FIG. 3, a diagram of a feature-based API comparative benchmarking system is depicted in which illustrative embodiments may be implemented. API comparative benchmarking system 300 is a system of software and hardware components for pricing application programming interfaces using cognitive feature-based comparative benchmarking and value rationalization API comparative benchmarking system 300 may be implemented in a network of data processing systems, such as network data processing system 100 in FIG. 1.

In this example, API comparative benchmarking system 300 includes server 302, remote databases 304, and websites 306. Server 302 may be, for example, server 104 in FIG. 1 or data processing system 200 in FIG. 2. Remote databases 304 and websites 306 may represent, for example, data sources 220 in FIG. 2. However, it should be noted that API comparative benchmarking system 300 is intended as an example only and may include any number of servers, remote databases, websites, and other data processing devices and components not shown.

Server 302 searches remote databases 304 and websites 306 for information regarding available APIs in the marketplace and reference API attribute information, such as reference API attribute information 222 in FIG. 2, for reference pricing input using search engine 308. Search engine 308 crawls remote databases 304 of various API providers within a domain or industry to retrieve reference API attribute information, which includes API characteristics and features, from API industry standards, API specifications, API literature, API metadata, and industry API taxonomies, for example. Search engine 308 crawls websites 306 to retrieve reference API attribute information from API articles, API blogs, API reviews, and API ratings, for example.

Search engine 308 collects and stores the retrieved reference API attribute information in API knowledge corpus 310. API knowledge corpus 310 is a query-enabled repository of API specifications, documents, industry API taxonomies, and related information, such as API usage statistics, reviews, and the like. Learning engine 312 receives the reference API attribute information from knowledge corpus 310 on a periodic basis, for example, for analysis and learning. In addition, learning engine 312 receives organizational, domain, or business process input 314 regarding APIs. Learning engine 312 performs cognitive concept and entity extraction from collected API corpus and literature using entity-relationship analysis and natural language learning models. Learning engine 312 performs API annotation and metadata enrichment based on extracted concepts and relationships. Learning engine 312 is responsible for input parameter vectorization based on extracted concept relationships and ground truths.

Learning engine 312 gains API knowledge over time by extracting key attributes/features of APIs from documentation, sorting the data, and analyzing API performance. Further, learning engine 312 may capture relationships between different APIs. Furthermore, learning engine 312 may monitor API pricing over different periods of time to determine API provider pricing trends and to determine API consumer purchasing trends. Moreover, learning engine 312 may monitor negotiations between API providers and consumers regarding different APIs to identify and learn from successful and failed API pricing negotiations.

Learning engine 312 sends the extracted attribute/feature information corresponding to APIs to natural language-based classifier 316. Natural language-based classifier 316 utilizes natural language processing and machine learning to place the APIs into different classes of APIs based on features of each respective API for comparative price benchmarking. Natural language-based classifier 316 performs cognitive classification based on collected API metadata and functional/nonfunctional characteristics. Natural language-based classifier 316 executes natural language driven deep learning models to classify APIs based on domain taxonomy and business function/process alignment.

Cognitive cataloging and pricing agent 318 uses cognitive classification to generate a catalog of APIs across one or more API providers, with groups/sub-groups driven by similar functional and non-functional API features. Cognitive cataloging and pricing agent 318 derives a matrix of recommended prices based on key features that have higher/lower relevance to the organization or industry/domain. Cognitive cataloging and pricing agent 318 sends the information to comparative value benchmarking handler 320.

Comparative value benchmarking handler 320 performs recursive value benchmarking and trade-off analysis/scoring by comparing APIs that are grouped together on certain functional and non-functional strengths/drawbacks. Comparative value benchmarking handler 320 leverages relative comparisons/benchmark information extracted from blogs, review, and ratings. Comparative value benchmarking handler 320 determines benchmark confidence scores for similarly grouped APIs based on comparative analysis with other APIs within the group/parent hierarchy. Comparative value benchmarking handler 320 shares this information with cognitive cataloging and pricing agent 318.

Cognitive cataloging and pricing agent 318 sends its information to API pricing configuration manager 322. API pricing configuration manager 322 may be, for example, API pricing manager 218 in FIG. 2. API pricing configuration manager 322 calculates a price or price range for each particular target API based on cognitive feature-based comparative price benchmarking information received from cognitive cataloging and pricing agent 318. The price or price range may be on, for example, an hourly basis, a daily basis, a premium basis, and the like. API pricing configuration manager 322 provides an ability to update API pricing configuration and parameters, such as rates, metering units, slabs, discounting parameters, and the like, based on the suggested pricing, as per domain considerations and organizational priorities. API pricing configuration manager 322 is responsible for relaying/publishing suggested pricing parameters in organizational and/or third-party API registry/discovery services and aggregators, as applicable.

API management and pricing assistant 324 provides a user interface, such as a graphical user interface, for API sponsors, administrators, and operations to edit organization and domain specific preferences and critical features. API management and pricing assistant 324 provides pricing/metering recommendations, such as optimal charging parameters (e.g., rate, price slabs, discounts, and the like). API management and pricing assistant 324 provides an interactive dashboard where API owners/sponsors can dynamically alter the criticality of features and view updated pricing recommendations. API management and pricing assistant 324 provides user interface-based capability to trigger pricing revisions based on the recommended pricing. API management and pricing assistant 324 provides an ability to interactively review API binding criteria that determines which API to bind to based on closet price match as per domain and organizational parameters. Thus, API management and pricing assistant 324 may maximize API revenue and provide a competitive advantage in the API marketplace.

Further, API management and pricing assistant 324 shares the pricing information with cognitive cataloging and pricing agent 318. Furthermore, API management and pricing assistant 324 receives business and operational feedback, reviews, and ratings. API management and pricing assistant 324 shares business and operational feedback, reviews, and ratings 326 with learning engine 312.

With reference now to FIG. 4, a diagram illustrating an example of an API comparative benchmarking graphical user interface is depicted in accordance with an illustrative embodiment. API comparative benchmarking graphical user interface 400 may be implemented in a computer, such as server 104 in FIG. 1, data processing system 200 in FIG. 2, or server 302 in FIG. 3. API comparative benchmarking graphical user interface 400 provides a comparative view of a target API, such as target API 228 in FIG. 2, and a set of one or more reference APIs for benchmarking.

An API pricing manager, such as API pricing manager 218 in FIG. 2 or API pricing configuration manager 322 in FIG. 3, may generate API comparative benchmarking graphical user interface 400 based on information collected from a plurality of data sources. The plurality of data sources may be, for example, data sources 220 in FIG. 2 or remote databases 304, websites 306, organizational, domain, or business process input 314, and business and organizational feedback, reviews, and ratings 326 in FIG. 3. API comparative benchmarking graphical user interface 400 is an interactive graphical user interface that makes it easier for a user to study the impact of features for different APIs and to make pricing adjustments.

In this example, API comparative benchmarking graphical user interface 400 includes API name 402, API standard 404, benchmark confidence score (BCS) matching level 406, and pricing 408. However, it should be noted that API comparative benchmarking graphical user interface 400 is intended as an example only and not a limitation on different illustrative embodiments. In other words, alternative illustrative embodiments may include more or less information in API comparative benchmarking graphical user interface 400 than shown.

Also in this example, API comparative benchmarking graphical user interface 400 includes target API 410, reference API 1 412, reference API 2 414, and reference API 3 416. However, it should be noted that API comparative benchmarking graphical user interface 400 may include any number of reference APIs for comparative benchmarking.

This example further illustrates that the name of target API 410 is "getEquipmentHealthInfo", which is an industry standard API, with a suggested price of $0.11 per API call. The name of reference API 1 412 is "getAssetConditionInfo", which is an open standard API, having a "Medium" benchmark confidence score matching level with target API 410 and a price of $0.09 per API call. The name of reference API 2 414 is "getEquipmentConditionInfo", which is another industry standard API, having a "High" benchmark confidence score matching level with target API 410 and a price of $0.12 per API call. The name of reference API 3 416 is "getAssetHealthInfo", which is an enterprise standard API, having a "High" benchmark confidence score matching level with target API 410 and a price of $0.10 per API call.

It should be noted that target API 410, reference API 1 412, reference API 2 414, and reference API 3 416 are all in a same API class based on attributes or features of each respective API. Also, it should be noted that the suggested price of $0.11 per API call for target API 410 is an average of the $0.12 per API call and $0.10 per API call for reference API 2 414 and reference API 3 416, respectively.

Figure 5:
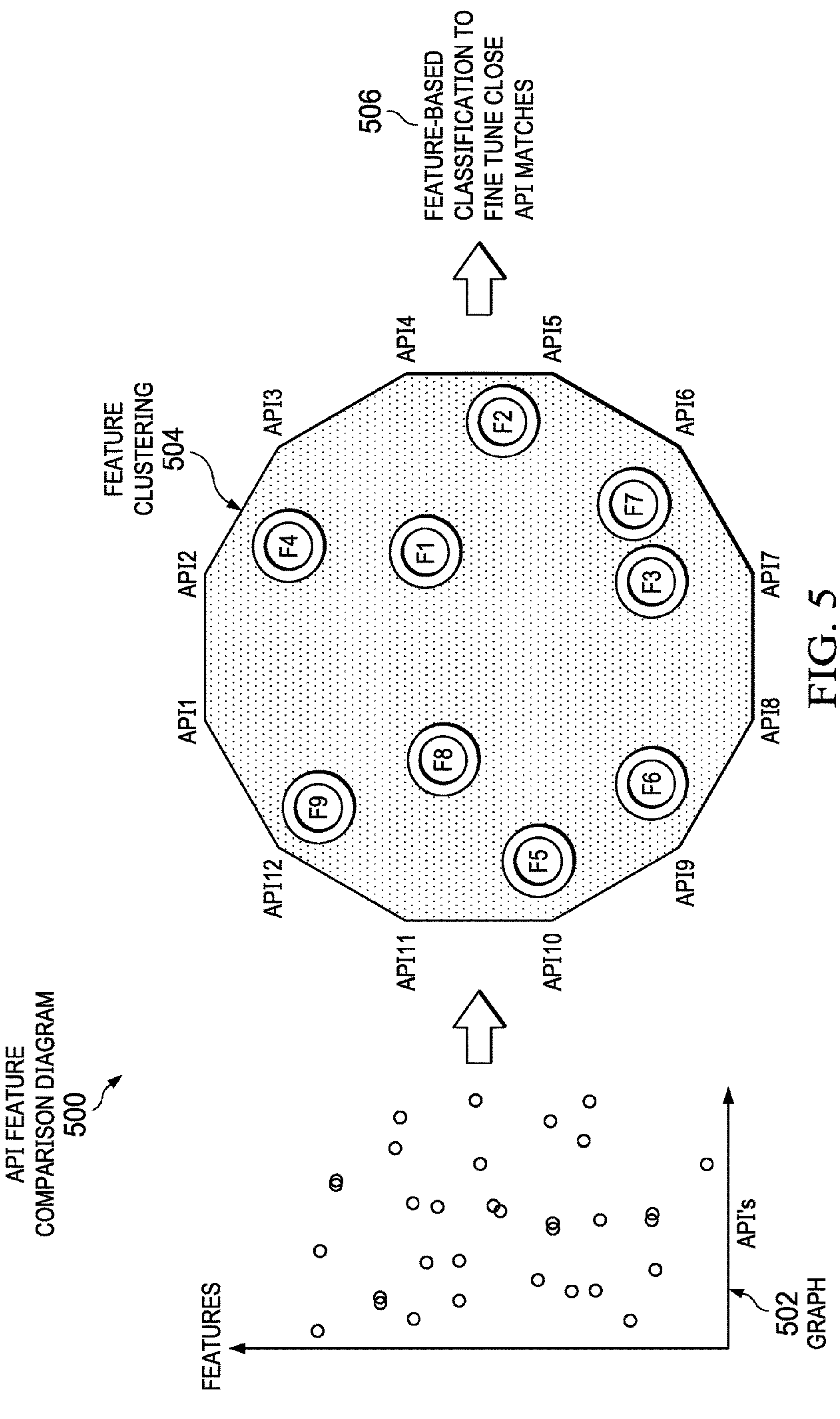
FIG. 5 is an example of an API feature comparison diagram in accordance with an illustrative embodiment.

With reference now to FIG. 5, an example of an API feature comparison diagram is depicted in accordance with an illustrative embodiment. API feature comparison diagram 500 includes graph 502, feature clustering 504, and feature-based classification 506. Graph 502 illustrates a relationship between APIs along an x-axis and API features along a y-axis of the graph. Feature clustering 504 illustrates an affinity between features F1-F9 and APIs 1-12. For example, features F1-F4 and F7 have an affinity toward APIs 2-7 and features F5, F6, F8, and F9 have an affinity toward APIs 9-12. Illustrative embodiments utilize feature-based classification 506 to fine tune pricing of close API matches.

Illustrative embodiments identify close API matches using API classification and Euclidean distance techniques. While similar APIs that are available in the API marketplace are at some level of maturity, the level maturity of these APIs changes over time. As API maturity levels change, the feature-based affinity to APIs also changes, which changes the feature-based classification of these APIs. This in essence will provide a specific snapshot of an API feature comparison at a particular point in time. Illustrative embodiments utilize unsupervised machine learning to train data to derive feature-based API classification and to test current versions of APIs of an enterprise's portfolio with the trained data to determine a feature comparison score using supervised machine learning in an iterative process.

With reference now to FIG. 6, an example of an API feature comparison table is depicted in accordance with an illustrative embodiment. API feature comparison table 600 includes features 602, score 604, and relative pricing 606. Features 602 represent features corresponding to reference APIs. In this example, features 602 include features F1-F7, which are similar to features F1-F7 in the example of FIG. 5. Score 604 represents a benchmark confidence score for reference APIs based on perceived value by API consumers. Relative pricing 606 represents inputs for fine tuning pricing of a target API, such as, for example, target API 228 in FIG. 2. In this example, reference API 3, which includes feature F4, has a benchmark confidence score of 99 indicating a closest matching API to the target API; reference API 6, which includes feature F7, has as benchmark confidence score of 96 indicating a second-closest matching API to the target API; and so on.

Illustrative embodiments utilize relative pricing input for API feature comparison to fine tune target API pricing. Relative pricing is dynamic and needs to be analyzed every quarter, or more frequently, to stay competitive in the API marketplace. It should be noted that an API cost view is already available in most enterprises so that base API pricing is already established. Illustrative embodiments fine tune this base API pricing using cognitive feature-based comparative benchmarking. Illustrative embodiments use a supervised machine learning algorithm to determine closest API matches in terms of API feature sets. For example, illustrative embodiments may use a Multi-Label k-Nearest Neighbor (ML-kNN) algorithm, which is a first-order learning algorithm that compares feature similarities of each API independently of other APIs. The basic idea of this algorithm is to adapt k-nearest neighbor techniques to deal with multi-labeled data. Illustrative embodiments utilize this process to make cognitive predictions by reasoning based on the labeled information embodied in the neighbors.

Illustrative embodiments use a clustering algorithm to determine the measure of co-relation in terms of closest matching APIs with respect to feature sets of respective APIs. Thus, illustrative embodiments measure the compactness of API clusters using some similarity measure to measure the intra-cluster homogeneity, the inter-cluster separability, or a combination of the intra-cluster homogeneity and the inter-cluster separability.

An example of such an evaluation measure is scalar scatter criteria. Scalar scatter criteria are derived from scatter matrices, which reflect the within-cluster scatter, the between-cluster scatter, and their summation (i.e., the total scatter matrix). For the kth cluster, illustrative embodiments calculate the scatter matrix as:

$$S_k=\Sigma_{x\in Ck}(x-\mu_k)(x-\mu_k)^T, \quad \text{(Equation 1)}$$

where $C_k$=cluster k of API, and $x \in C_k$.

Illustrative embodiments calculate the within-cluster scatter matrix as the summation of the scatter matrix over all clusters:

$$S_W = \sum_{k=1}^{K} S_k. \quad \text{(Equation 2)}$$

Illustrative embodiments calculate the between-cluster scatter matrix as:

$$S_B = \sum_{k=1}^{K} N_k(\mu_k - \mu)(\mu_k - \mu)^7, \quad \text{(Equation 3)}$$

where μ is the total mean vector and is defined as:

$$\mu = 1/m\sum_{k=1}^{K} N_{k\mu k}, \quad \text{(Equation 4)}$$

where $N_k$=|$Ck_j$|, which is the number of instances belonging to cluster k. Illustrative embodiments may then measure the benchmarking accuracy or the benchmark confidence score of an API as a function of the trace of $S_W$ representing the within-cluster scatter, which is to be minimized, and the trace of $S_B$ representing the between-cluster scatter, which is to be maximized.

Figure 7A:
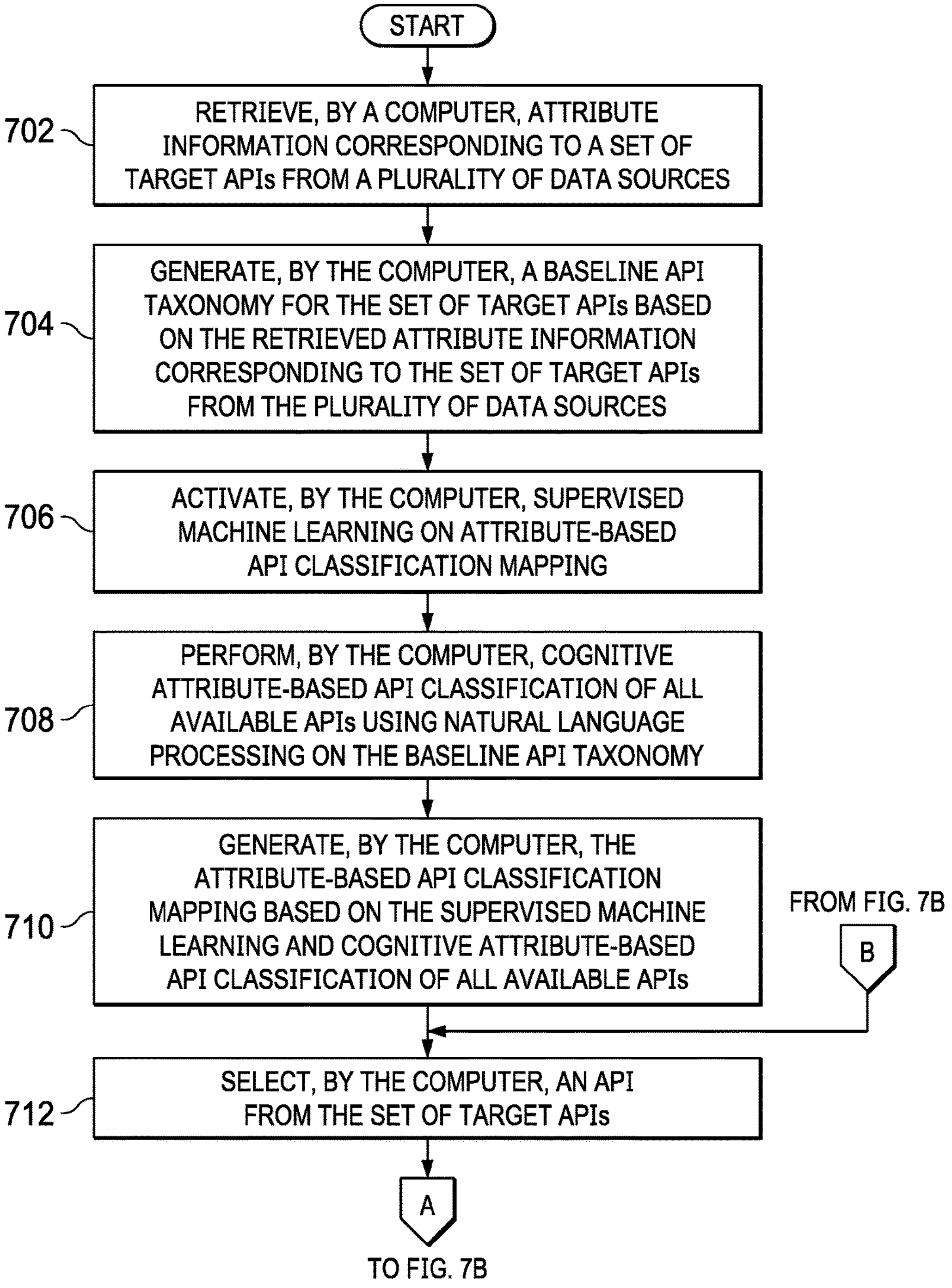
FIGS. 7A-7B are a flowchart illustrating a process for attribute-based API cognitive comparative benchmarking in accordance with an illustrative embodiment.
Figure 7B:
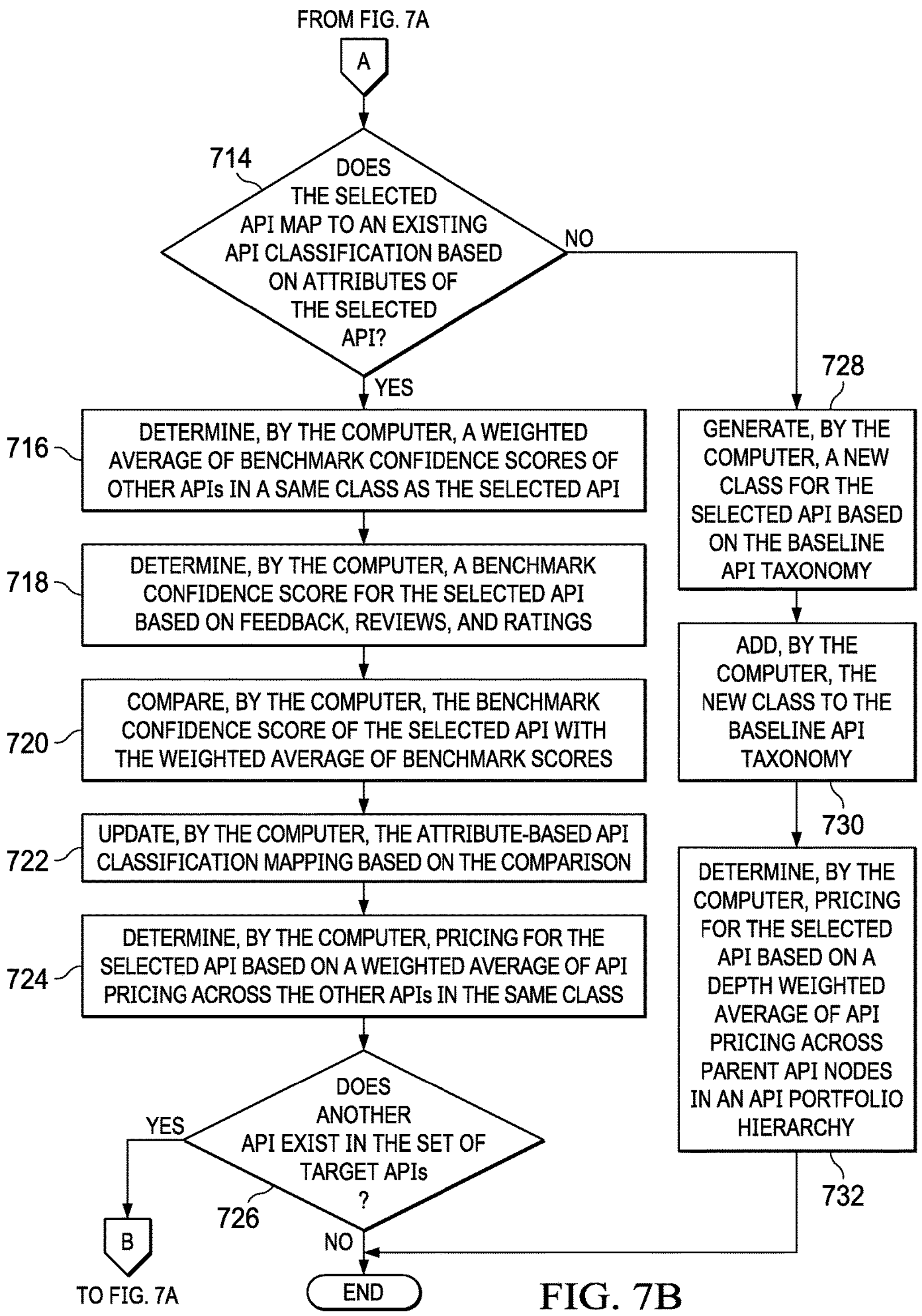

With reference now to FIGS. 7A-7B, a flowchart illustrating a process for attribute-based API comparative benchmarking is shown in accordance with an illustrative embodiment. The process shown in FIGS. 7A-7B may be implemented in a computer, such as, for example, server 104 in FIG. 1 or data processing system 200 in FIG. 2.

The process begins when the computer retrieves attribute information corresponding to a set of target APIs from a plurality of data sources (step 702). Afterward, the computer generates a baseline API taxonomy for the set of target APIs based on the retrieved attribute information corresponding to the set of target APIs from the plurality of data sources (step 704). In addition, the computer activates supervised machine learning on attribute-based API classification mapping (step 706).

Subsequently, the computer performs cognitive attribute-based API classification of all available APIs using natural language processing on the baseline API taxonomy (step 708). Further, the computer generates the attribute-based API classification mapping based on the supervised machine learning and cognitive attribute-based API classification of all available APIs (step 710). Then, the computer selects an API from the set of target APIs (step 712).

Afterward, the computer makes a determination as to whether the selected API maps to an existing API classification based on attributes of the selected API (step 714). If the computer determines that the selected API does map to an existing API classification based on the attributes of the selected API, yes output of step 714, then the computer determines a weighted average of benchmark confidence scores of other APIs in a same class as the selected API (step 716). Furthermore, the computer determines a benchmark confidence score for the selected API based on feedback, reviews, and ratings (step 718).

The computer compares the benchmark confidence score of the selected API with the weighted average of benchmark scores (step 720). The computer updates the attribute-based API classification mapping based on the comparison (step 722). The computer determines pricing for the selected API based on a weighted average of API pricing across the other APIs in the same class (step 724).

Subsequently, the computer makes a determination as to whether another API exists in the set of target APIs (step 726). If the computer determines that another API does exist in the set of target APIs, yes output of step 726, then the process returns to step 712 where the computer selects another API from the set of target APIs. If the computer determines that another API does not exist in the set of target APIs, no output of step 726, then the process terminates thereafter.

Returning again to step 714, if the computer determines that the selected API does not map to an existing API classification based on the attributes of the selected API, no output of step 714, then the computer generates a new class for the selected API based on the baseline API taxonomy (step 728). The computer adds the new class to the baseline API taxonomy (step 730). The computer determines pricing for the selected API based on a depth weighted average of API pricing across parent API nodes in an API portfolio hierarchy (step 732). Thereafter, the process terminates.

Thus, illustrative embodiments of the present invention provide a computer-implemented method, computer system, and computer program product for application programming interface pricing using cognitive comparative benchmarking and value rationalization. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for attribute-based application programming interface (API) comparative benchmarking, the computer-implemented method comprising:

responsive to a computer determining that a target API maps to an existing API classification based on attributes of the target API, determining, by the computer, a weighted average of benchmark confidence scores of other APIs in a same class as the target API;

determining, by the computer, a benchmark confidence score for the target API based on feedback, reviews, and ratings;

comparing, by the computer, the benchmark confidence score of the target API with the weighted average of benchmark scores;

updating, by the computer, an attribute-based API classification mapping based on the comparing; and determining, by the computer, pricing for the target API based on a weighted average of API pricing across the other APIs in the same class as the target API.

2. The computer-implemented method of claim 1 further comprising:

responsive to the computer determining that the target API does not map to an existing API classification based on the attributes of the target API, generating, by the computer, a new class for the target API based on a baseline API taxonomy;

adding, by the computer, the new class to the baseline API taxonomy; and determining, by the computer, the pricing for the target API based on a depth weighted average of API pricing across parent API nodes in an API portfolio hierarchy.

3. The computer-implemented method of claim 1 further comprising:

retrieving, by the computer, attribute information corresponding to a set of target APIs from a plurality of data sources; and generating, by the computer, a baseline API taxonomy for the set of target APIs based on the retrieved attribute information corresponding to the set of target APIs from the plurality of data sources.

4. The computer-implemented method of claim 1 further comprising:

performing, by the computer, cognitive attribute-based API classification of all available APIs using natural language processing on a baseline API taxonomy; and generating, by the computer, the attribute-based API classification mapping based on supervised machine learning and the cognitive attribute-based API classification of all available APIs.

5. The computer-implemented method of claim 1 further comprising:

determining, by the computer, reference pricing using machine learning, wherein the machine learning determines API classification using natural language processing based on API documentation for price benchmarking of the target API in relation to the other APIs in the same class having similar function across standards and providers.

6. The computer-implemented method of claim 1 further comprising:

dynamically adjusting, by the computer, pricing parameters based on quality and relevance of a reference API determined to be in the same class as the target API and based on competitive evaluation of the quality and relevance of the reference API across one or more API providers using supervised machine learning on at least one of an atomic level and an aggregated level.

7. The computer-implemented method of claim 1 further comprising:

deriving, by the computer, target pricing of APIs based on respective API benchmark confidence scores, wherein the respective API benchmark confidence scores are based on closeness of API nodes to other API nodes at one or more of a same level and a distance from parent API nodes in an API portfolio hierarchy within a same API class.

8. The computer-implemented method of claim 1 further comprising:

automatically adjusting, by the computer, API pricing thresholds via continuous discovery of similar APIs across an organization and third-party providers given a business context that is based on organizational or domain feedback.

9. The computer-implemented method of claim 1 further comprising:

iteratively refining, by the computer, API pricing using benchmark confidence scores and re-pricing closest matching APIs to the target API based on dynamically varying weights, wherein the computer dynamically varies the weights based on input from a user.

10. The computer-implemented method of claim 1 further comprising:

determining, by the computer, API price based on comparative benchmark confidence scoring with respect to APIs with similar functional and non-functional features.

11. The computer-implemented method of claim 1 further comprising:

generating, by the computer, an interactive graphical user interface that makes it easier for a user to study impact of different API features on cognitive feature-based comparative API benchmarking.

12. A computer system for attribute-based application programming interface (API) comparative benchmarking, the computer system comprising:

a bus system;

a storage device connected to the bus system, wherein the storage device stores program instructions; and a processor connected to the bus system, wherein the processor executes the program instructions to:

determine a weighted average of benchmark confidence scores of other APIs in a same class as a target API in response to determining that the target API maps to an existing API classification based on attributes of the target API;

determine a benchmark confidence score for the target API based on feedback, reviews, and ratings;

compare the benchmark confidence score of the target API with the weighted average of benchmark scores;

update an attribute-based API classification mapping based on comparing; and determine pricing for the target API based on a weighted average of API pricing across the other APIs in the same class as the target API.

13. The computer system of claim 12, wherein the processor further executes the program instructions to:

generate a new class for the target API based on a baseline API taxonomy in response to determining that the target API does not map to an existing API classification based on the attributes of the target API;

add the new class to the baseline API taxonomy; and determine the pricing for the target API based on a depth weighted average of API pricing across parent API nodes in an API portfolio hierarchy.

14. A computer program product for attribute-based application programming interface (API) comparative benchmarking, the computer program product comprising a computer readable storage medium having program instructions embodied therewith, the program instructions executable by a computer to cause the computer to perform a method comprising:

responsive to the computer determining that a target API maps to an existing API classification based on attributes of the target API, determining, by the computer, a weighted average of benchmark confidence scores of other APIs in a same class as the target API;

determining, by the computer, a benchmark confidence score for the target API based on feedback, reviews, and ratings;

comparing, by the computer, the benchmark confidence score of the target API with the weighted average of benchmark scores;

updating, by the computer, an attribute-based API classification mapping based on the comparing; and determining, by the computer, pricing for the target API based on a weighted average of API pricing across the other APIs in the same class as the target API.

15. The computer program product of claim 14 further comprising:

responsive to the computer determining that the target API does not map to an existing API classification based on the attributes of the target API, generating, by the computer, a new class for the target API based on a baseline API taxonomy;

adding, by the computer, the new class to the baseline API taxonomy; and determining, by the computer, the pricing for the target API based on a depth weighted average of API pricing across parent API nodes in an API portfolio hierarchy.

16. The computer program product of claim 14 further comprising:

retrieving, by the computer, attribute information corresponding to a set of target APIs from a plurality of data sources; and generating, by the computer, a baseline API taxonomy for the set of target APIs based on the retrieved attribute information corresponding to the set of target APIs from the plurality of data sources.

17. The computer program product of claim 14 further comprising:

performing, by the computer, cognitive attribute-based API classification of all available APIs using natural language processing on a baseline API taxonomy; and generating, by the computer, the attribute-based API classification mapping based on supervised machine learning and the cognitive attribute-based API classification of all available APIs.

18. The computer program product of claim 14 further comprising:

determining, by the computer, reference pricing using machine learning, wherein the machine learning determines API classification using natural language processing based on API documentation for price benchmarking of the target API in relation to the other APIs in the same class having similar function across standards and providers.

19. The computer program product of claim 14 further comprising:

dynamically adjusting, by the computer, pricing parameters based on quality and relevance of a reference API determined to be in the same class as the target API and based on competitive evaluation of the quality and relevance of the reference API across one or more API providers using supervised machine learning on at least one of an atomic level and an aggregated level.

20. The computer program product of claim 14 further comprising:

deriving, by the computer, target pricing of APIs based on respective API benchmark confidence scores, wherein the respective API benchmark confidence scores are based on closeness of API nodes to other API nodes at one or more of a same level and a distance from parent API nodes in an API portfolio hierarchy within a same API class.

* * * * *